UNITED STATES PATENT OFFICE.

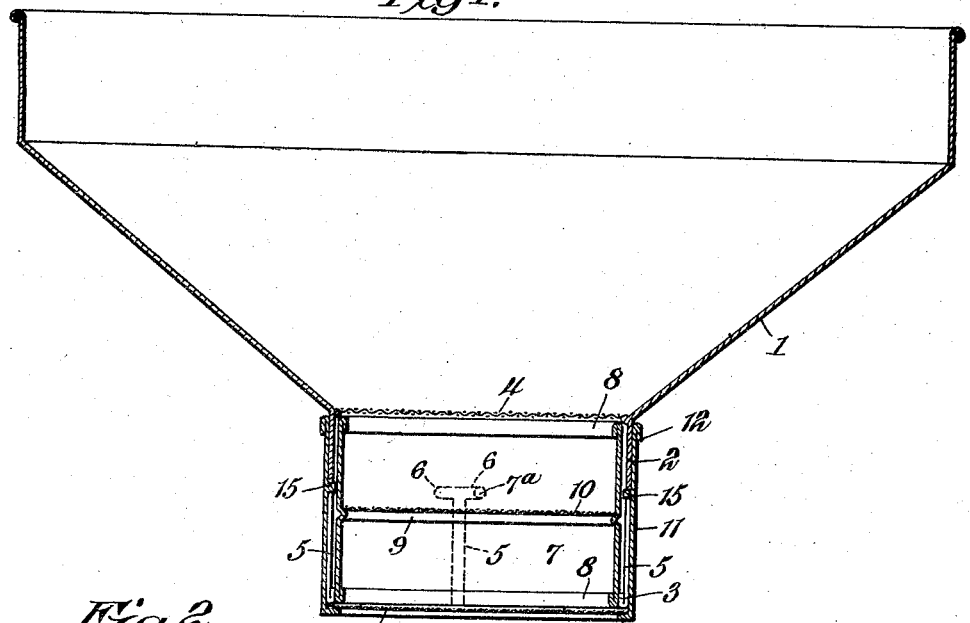

GEORGE AARON KONKLE, OF MONTOURSVILLE, PENNSYLVANIA.

MILK-STRAINER.

1,307,677.  Specification of Letters Patent.  Patented June 24, 1919.

Application filed April 15, 1919. Serial No. 290,216.

*To all whom it may concern:*

Be it known that I, GEORGE A. KONKLE, a citizen of the United States, residing at Montoursville, in the county of Lycoming and State of Pennsylvania, have invented certain new and useful Improvements in Milk-Strainers, of which the following is a specification.

This invention relates to strainers, and more particularly to devices for straining milk, for use in dairies and other similar places where great quantities of milk are handled, and where particular care must be exercised in order to remove all foreign matter from the same before shipment or delivery.

The object is to provide a device for straining milk which will subject the latter to a plurality of strainings through sieves of different degrees of fineness of mesh during the process of pouring the milk from the original containers into shipping cans or other vessels, and to combine such straining mediums into a single device which may be readily handled and applied to the necks of such cans or vessels or removed therefrom.

Another object is to provide a strainer of this character wherein the several sieves may be readily removed from their holding means for the purpose of cleansing and removing all foreign substance therefrom.

A full and complete understanding of the invention may be obtained from a consideration of the following detailed description, taken in connection with the accompanying drawing forming part of this specification; it being understood that while the drawing shows a practical form of the invention, the latter is not confined to strict conformity therewith, but may be changed or modified, so long as such changes or modifications mark no material departure from the salient features of the invention, as specifically pointed out in the appended claims.

In the drawing, in which similar reference characters designate corresponding parts throughout the several figures:—

Figure 1 is a vertical sectional view of a milk strainer in the form of a funnel having the improved straining means embodied therein.

Fig. 2 is a detail sectional view of the lower portion of the funnel, having the detachable parts removed therefrom.

Fig. 3 is a horizontal section taken on the line 3—3 and looking in the direction of the arrow.

Fig. 4 is a side elevation of the inner removable part.

Fig. 5 is a plan view of the same.

Fig. 6 is a side elevation of the outer removable part of the device; and

Fig. 7 is a plan view thereof.

Referring to the drawing, there is illustrated a metallic funnel of ordinary form, such as is commonly employed in the handling of milk, and which is adapted to fit within the neck of a milk can or other vessel for the purpose of directing or funneling the milk into the can. The funnel comprises the usual circular inclined wall 1 terminating at its inner or lower edge in the reduced neck 2 which is suitably strengthened at its lower edge by returning the metal upon itself to form the circular bead 3 in the usual manner. The device thus far described may be of any of the well-known forms of funnels, and the size and proportion of the same may be altered to suit the particular use to which the same is put. I do not limit myself to the use of the invention in the funnel type of milk strainers.

A circular wire screen 4 of relatively coarse mesh is soldered or otherwise secured within the funnel at the point of juncture of the inclined wall 1 with reduced neck 2 and completely bridges the space therein. This screen is adapted to catch and to hold the larger particles of foreign matter which the milk may contain, and by inverting the funnel within a vessel of water or other cleansing solution, may be readily cleaned and such particles removed therefrom.

At diametrically opposite points the reduced neck is provided with a plurality of bayonet slots 5, extending from the lower edge of the same, upwardly toward the screen 4, a distance slightly more than half its length, the said slots terminating in oppositely disposed branches 6—6 arranged at right angles thereto, or in a horizontal plane. These slots 5, which are preferably, though not necessarily, four in number, are for the purpose of co-acting with certain means carried by removable parts of the device, for the purpose of holding the same in position.

An inner, annular removable sleeve 7, having suitable strengthening beads 8 provided at its upper and lower edges respectively and formed in a manner similar to the aforesaid bead 3, is adapted to be inserted within the reduced neck 2, the external diameter of the said sleeve 7 being such as to readily permit of the introduction of the same within the bead 3 and to allow of its passage upwardly therein, until the upper edge of the said sleeve is located adjacent to the screen 4. It will be noted from Fig. 1 that the said sleeve is approximately equal in length to the neck 2. The sleeve 7 is provided at a point midway of its length with an inwardly-directed bead 9 extending entirely around the wall thereof and adapted to strengthen the same and to form a rest for a second sieve or screen 10, which completely bridges the space therein and is preferably soldered or otherwise secured within the said sleeve 7. The screen 10 is thus spaced from the first named screen and is formed of somewhat finer mesh than the latter, and its function is to catch and to hold particles of foreign substance contained in the milk, which may be smaller in size and which may have passed through the first-named screen 4.

At diametrically opposite points the sleeve 7 is provided with a pair of outwardly-directed pins 7ª secured thereto in any desired manner, at such a distance from the top edge thereof as to readily enter one or the other of the horizontal branches 6—6 of the slots 5—5 depending upon the direction of turning of the inner sleeve 7, it being, of course understood, that the pins have been positioned within the upright branches of said slots and forced to traverse the entire length of the same, as the inner sleeve 7 is forced up into its position within the reduced neck of the funnel.

An outer removable sleeve 11 is adapted to fit over the said reduced neck 2 of the funnel, having at its upper edge a strengthening bead 12 which is located adjacent to the lower end of the inclined wall 1 of the funnel, when the said sleeve is in position thereon. The sleeve 11 is further provided at its lower edge with an inwardly-directed flange 13 extending entirely around the same and adapted to strengthen the same and to form a seat for a lower screen 14, which is cut to fit the said sleeve and is soldered or otherwise secured within the sleeve upon the said flange. This screen 14 is thus positioned and held in spaced relation to the intermediate screen 10, and at a distance therefrom substantially equal to the distance between the first and second named screens, and is formed of a still finer mesh than the said intermediate screen, for the purpose of a final effective straining of the milk to remove the smallest particles of foreign substance therefrom.

The outer removable sleeve 11 is provided with a pair of oppositely disposed, inwardly-directed pins 15—15 which are adapted to be introduced into the other pair of bayonet slots 5 formed in the neck 2 of the funnel, and to be turned either to the right or the left to force the same into one of the terminal branches 6 to lock the outer sleeve 11 in position on the neck of the funnel, attention being directed to the fact that the pins 7ª and 15 of the inner and outer removable sleeves respectively are so positioned thereon as to enter the said branches 6, when the said sleeves are in their proper positions with relation to the neck of the funnel. In practice the screens are made of copper wire and are held about one inch apart. It is a well known fact that sediment and hairs become embedded in the fabric of cloth milk strainers, making it almost impossible to keep them clean. By the construction shown, the strainer may be kept in a thoroughly sanitary condition at all times.

From the foregoing, it will be seen that a simple, cheap and durable straining device has been provided for use in the handling of milk or similar commodities, which may be readily manufactured and sold at a low cost, which may be easily applied to or removed from the necks of cans or other vessels, and which is capable of thorough cleansing, by reason of the separable parts which permit of ready access to both sides of the several screens to remove any accumulations thereon.

What I claim is:—

1. A strainer comprising a body having a neck and a screen therefor, an inner open-ended cylindrical sleeve carrying a screen and adapted to slide within said neck, and an outer open-ended cylindrical sleeve carrying a screen and adapted to slide over said neck, the said screens being maintained in spaced relation to each other.

2. A strainer comprising a body having a cylindrical neck, a screen for said neck, an open-ended cylindrical sleeve also having a screen and adapted to fit within said neck beneath the screen thereof, and having a length substantially equal thereto, and an outer open-ended cylindrical sleeve carrying a screen and adapted to fit outside said neck, and being of somewhat greater length than said neck, the screens being maintained in spaced relation to each other, and coacting means provided on the neck and sleeves for maintaining them in position.

3. A strainer comprising a funnel, having a reduced neck at its lower end, and a screen carried at the upper portion of said neck, an inner open-ended sleeve having a screen of finer mesh therein at a point intermediate its length and adapted to slide into said neck, and an outer open-ended sleeve carrying a screen of still finer mesh at its lower end and adapted to slide over the said neck, whereby the said screens are maintained in spaced relation to each other.

4. A strainer comprising a funnel-shaped body having a reduced neck at its smaller end, and carrying a screen at the upper portion of said neck, said neck being provided with a plurality of diametrically opposed bayonet slots, an inner open-ended sleeve adapted to enter said neck, a screen of finer mesh carried by the sleeve midway of its length and having a pair of opposite outwardly extending pins adapted to be turned into a pair of said slots, and an outer open-ended sleeve adapted to fit over the reduced neck and having a screen of still finer mesh at the lower end of the same, said sleeve having opposite inwardly-directed pins for engagement with another pair of said slots, the said slots and pins serving to maintain the sleeves in position with relation to the said neck and the several screens in spaced relation to each other.

In testimony whereof I affix my signature.

GEORGE AARON KONKLE.

Copies of this patent may be obtained for five cents each, by addressing the "Commissioner of Patents, Washington, D. C."